United States Patent [19]
Smith

[11] 3,921,809
[45] Nov. 25, 1975

[54] FRUIT CLEANER

[76] Inventor: George L. Smith, New York St., Sanford, Fla. 32771

[22] Filed: July 17, 1974

[21] Appl. No.: 489,189

[52] U.S. Cl. .................. 209/98; 209/136; 209/115
[51] Int. Cl.² .......................................... B07B 1/15
[58] Field of Search ......... 209/97, 98, 106, 85, 136, 209/137, 138, 139, 115; 15/3.11

[56] References Cited
UNITED STATES PATENTS

| | | | |
|---|---|---|---|
| 2,997,086 | 8/1961 | Armer............................. | 15/3.11 X |
| 3,227,276 | 1/1966 | Leighton et al................. | 209/139 R |
| 3,273,711 | 9/1966 | Smith.................................. | 209/98 |
| 3,455,446 | 7/1969 | Beazley.............................. | 209/98 |

FOREIGN PATENTS OR APPLICATIONS

| 196,655 | 8/1957 | Austria................................ | 209/98 |
|---|---|---|---|

Primary Examiner—Allen N. Knowles
Attorney, Agent, or Firm—Duckworth, Hobby & Allen

[57] ABSTRACT

Fruit cleaning apparatus includes a frame member having opposing sides defining an input and an output, with a plurality of stepped plates fixed between the sides with spaces defined therebetween. A blower directs fluid flow through the spaces, the position of the steps and the blower cooperating to separate unwanted materials from the fruit passing in the direction of feed. An actuator arm is coupled to all of the plates to change the pitch of the blades relative to the softness of the fruit, to further facilitate removal of leaves and other debris.

8 Claims, 5 Drawing Figures

FRUIT CLEANER

BACKGROUND OF THE INVENTION

1. Field of the Invention

The present invention relates to apparatus and methods for removing unwanted substances, such as dirt, leaves and other debris from fruit, especially citrus fruit, and similar products.

2. Description of the Prior Art

A wide variety of apparatus and methods for cleaning fruit and vegetables and separating unwanted materials therefrom are disclosed in the prior art. In many of these arrangements, a conveyor is employed which carries the food product past a blower which directs a stream of air over the product to remove leaves and other debris.

Other arrangements employ various tumbling, dual conveyor, washing and other techniques, either singly or in combination, to achieve removal of the unwanted materials. In U.S. Pat. No. 3,341,877 to Ingalls, there is shown a trommel type cleaning device. Ramont, in U.S. Pat. No. 2,578,944 discloses a combination conveyor and washing system. In U.S. Pat. No. 2,384,702, Sells et al teach a fruit cleaner employing a combination of tumbling, conveying and blowing steps. See also Volkov et al., U.S. Pat. No. 3,631,661.

Bradway, in U.S. Pat. No. 3,190,329 discloses a canted, dual-conveyor arrangement in which each conveyor is driven at a different speed to achieve a scouring action therebetween.

SUMMARY OF THE INVENTION

The present invention contemplates fruit cleaning apparatus comprising a frame member having opposing sides and defining an input end and an output end. A plurality of plates are fixed between the sides of the frame member, the plates being stepped downward in a direction of fruit feed from the input end toward the output end, with spaces defined between adjacent plates. Means are provided for directing fluid flow through the spaces, such that the plates and the fluid flow cooperate to thereby separate unwanted materials from the fruit passing in the direction of feed. In a preferred embodiment, means are provided for changing the pitch of the plates, or for changing the direction of fluid flow through the spaces, or both.

In accordance with another aspect of this invention, the pitch of the plates is changed dependent upon the firmness of the fruit which is to be passed across the plates, as in the case of citrus fruit, the angle of pitch with respect to the direction of feed is greater for increasing fruit softness.

THE DRAWING

Figure 1:
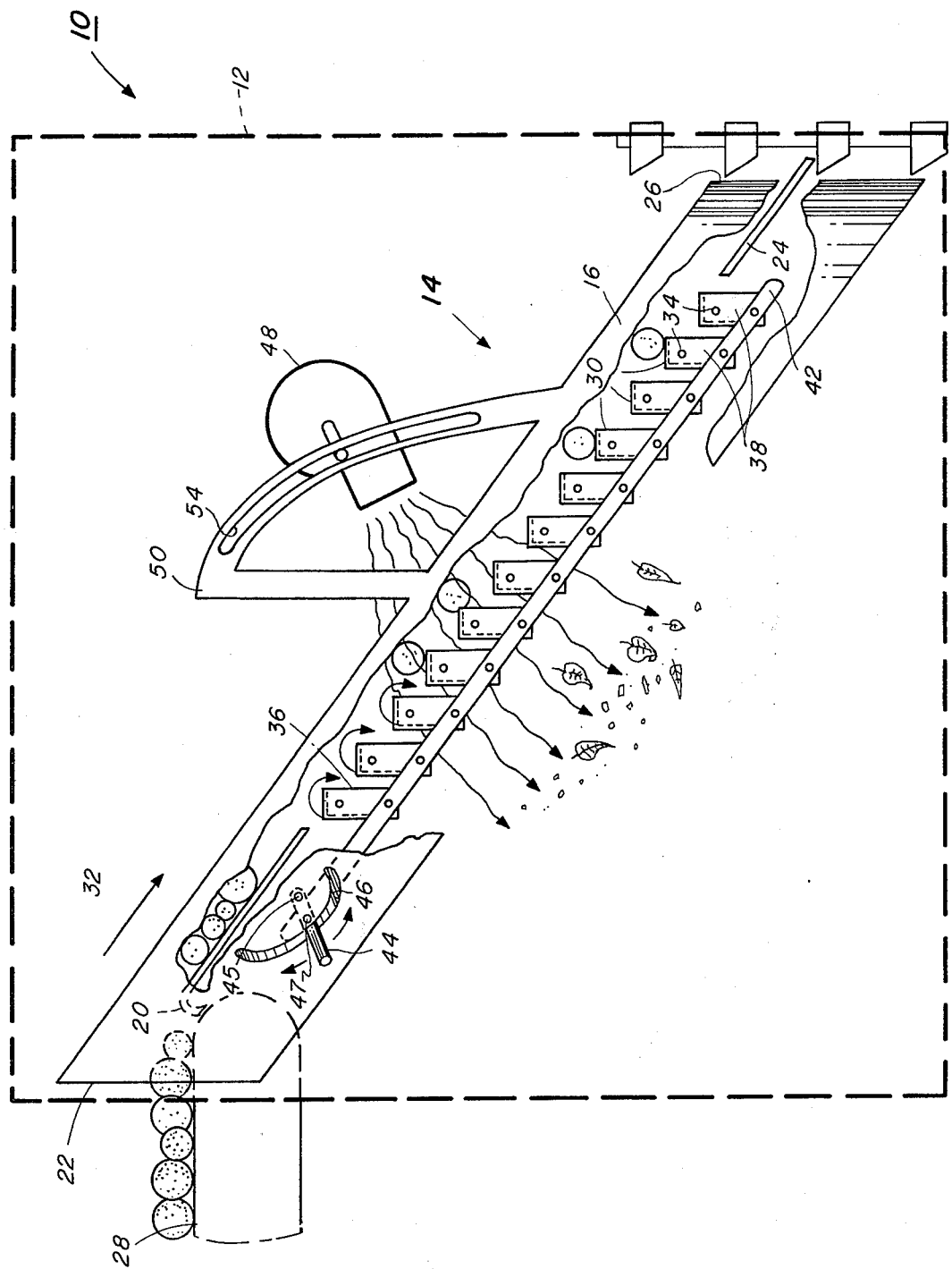
FIG. 1 is a side view of one embodiment of apparatus in accordance with the present invention, a removed portion of the apparatus being shown by dotted lines, the remaining portion being shown partially cut away.
Figure 3A:
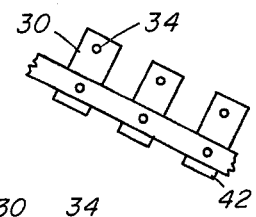
Figure 2:
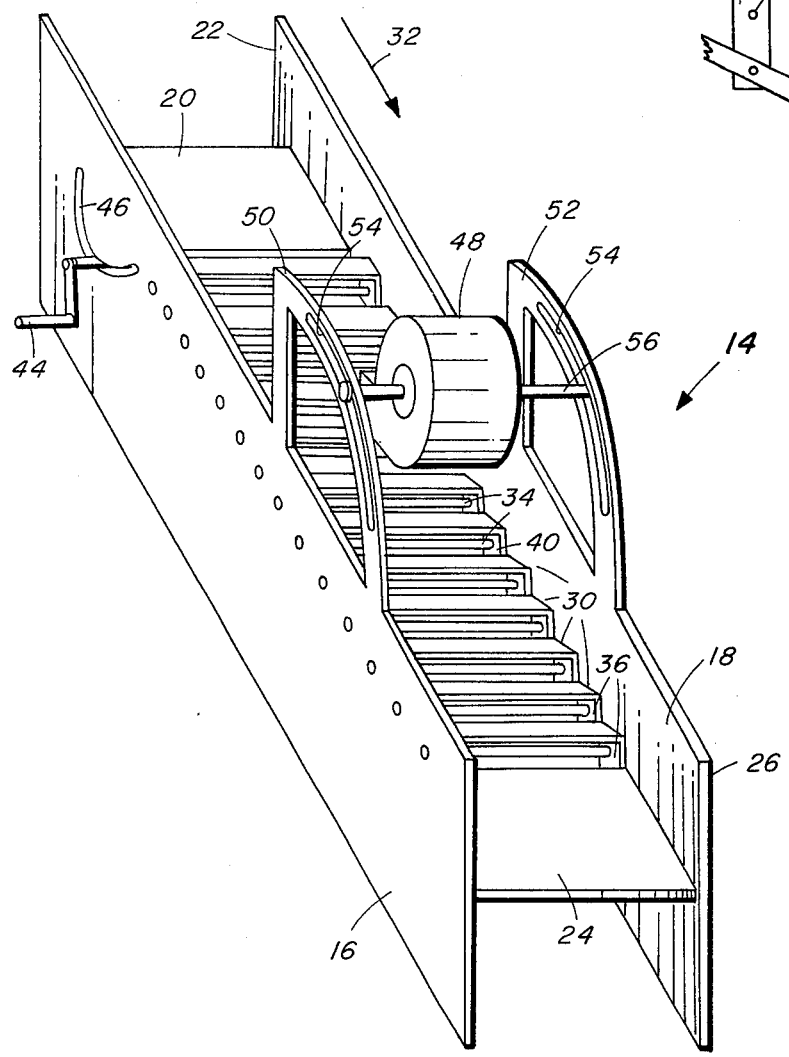
FIG. 2 is a front perspective view illustrating a portion of the apparatus shown in FIG. 1.

FIGS. 3(a), (b) and (c) illustrate the manner in which the apparatus of FIGS. 1 and 2 is adjusted according to the relative softness of the fruit.

DETAILED DESCRIPTION

An embodiment of a leaf and debris cleaner for fruit, vegetables and the like in accordance with the present invention is shown in FIGS. 1 and 2 and described with reference thereto.

The apparatus, referred to generally as 10, is disposed in an open-bottom enclosure 12 which may be a rectanguloid, for example, formed of a sheet metal or similar material. The enclosure 12 is shown by dotted lines in FIG. 1.

Noting both FIGS. 1 and 2, a frame member 14 is disposed within the enclosure 12, the frame member 14 having two opposing sides 16, 18 which are spaced by an accelerator plate 20 at an end 22 which defines the input to the apparatus 10, and an accumulator plate 24 at the opposite end 26 which defines the output of the apparatus. A grating is provided at the output end 26, through which the cleaned fruit passes.

The width of the frame member 14 between the two sides 16, 18 is not critical, but is determined by the width of the conveyor, or equivalent means, which feeds the fruit or vegetables into the apparatus 10. By way of example, an endless conveyor 28 is shown in FIG. 1 at the input end 22.

As clearly shown in FIG. 2, a plurality of separator plates 30 are spaced between the opposite sides 16, 18 of the frame member 14 downward in a direction of fruit feed as denoted by an arrow 32. Each plate 30 is rotatably fixed to a rod 34 between the two sides 16, 18, and with a space 36 defined between adjacent plates. Each plate 30 includes two depending flanges 38, 40, through which the rods 34 extend. Additionally, the flange 38 of each plate 30 is rotatably pinned to a variable pitch actuator arm 42 (FIG. 1) which extends downward in the direction 32 of fruit feed. The variable pitch actuator arm 42 is pinned to a control arm 44 at a pivot point near the input end 22, the control arm 44 extending through corresponding slots 46 and pinned to the inside of side 16 at pivot point 45.

Means are also provided for directing a fluid flow through the spaces 36. In this embodiment, this means comprises a blower 48 mounted above the frame member 14 on two curved holding members 50, 52 each of which is fixed to the upper edge of a corresponding one of the sides 16, 18 of the frame member. Each holding member 50, 52 has a curved slot 54 therethrough, the blower 48 being supported by a shaft 56 extending through the slots.

In operation, the fruit is fed from the conveyor 28 across the accelerator plate 20 downward across the plates 30 in the direction of feed 32. As the fruit moves across the plates 30, leaves, dirt and other undesirable materials are loosened from the fruit. At the same time, the arrangement of the plates 30 induces a vertical bouncing motion in the heavier fruit which is not imparted in the lighter leaves, dirt and other debris. The plates 30 and the fluid flow thus cooperate to cause the leaves and other unwanted materials to loosen from the fruit and pass through the spaces and downward out of the bottom of the enclosure 12. The cleaned fruit then passes across the accumulator plate 24 and out of the enclosure 12.

Figure 3B:
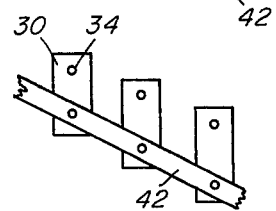
Figure 3C:
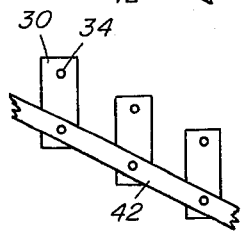

With specific reference to FIG. 3, the pitch i.e., the angle made between the top of each plate 30 and the direction of feed 32, can be changed by moving the variable pitch actuator arm to cause a small amount of rotation of each plate 30 about the corresponding rod 34. For example, it has been found that for use with citrus, improved results are obtained by providing a pitch angle which is substantially parallel with the direction of feed (note FIG. 3(a)) when the fruit to be cleaned constitutes fruit picked at the beginning of the picking season. This fruit is relatively hard, and the desired vertical motion is imparted easily to the fruit along the plates to provide the desired separation between the unwanted material and the fruit. When the fruit being cleaned constitutes citrus picked during the middle of the season, the fruit is substantially softer than the first of the season fruit, and consequently it has been found that a pitch angle like that shown in FIG. 3(b) results in a satisfactory cleaning operation. Finally, soft fruit picked at the end of the season is best cleaned by providing a pitch angle which is substantially transverse to the direction of feed 32. Such pitch angle is shown in FIG. 3(c).

It will be appreciated by those skilled in the art that various modifications may be made to the above described apparatus without departing from the scope of the present invention, as defined in the claims set forth next.

I claim:

1. Fruit cleaning apparatus comprising:
   a frame member having opposing sides and defining an input end and an output end;
   a plurality of plates fixed between said sides of said frame member, said plates stepped downward in a direction of fruit feed from said input end towards said output end with spaces defined between adjacent plates;
   means for directing a fluid flow through said spaces;
   two blower holding members, each supported by one of said sides and each including a curved slot therein;
   a shaft supporting said blower and extending through each said slot;
   movement of said shaft along said slots changes the fluid flow direction through said spaces, said plates and said fluid flow means cooperating to separate unwanted materials from fruit passing in said direction of feed.

2. The apparatus recited in claim 1 further comprising means for changing the pitch of at least one of said plates.

3. The apparatus recited in claim 2 wherein said pitchchanging means comprises:
   a plurality of rods, each said rod rotatably fixing a corresponding plate between said sides; and
   means for rotating each said plate about the corresponding rod.

4. The apparatus recited in claim 3 wherein said rotating means comprises:
   each said plate including a depending flange extending substantially perpendicular thereto;
   a variable pitch actuator arm pinned to said flange; and wherein
   movement of said actuator arm causes rotation of said plate about the corresponding rod.

5. The apparatus recited in claim 4 further comprising a variable pitch control arm coupled to said actuator arm and extending through said frame member whereby control of the pitch of said plate can be maintained from outside of said frame member.

6. The apparatus recited in claim 5 wherein said fluid flow directing means comprises a blower.

7. The apparatus recited in claim 2 further comprising an accelerator plate fixed between said sides at said input end and canted substantially parallel with the direction of fruit feed.

8. The apparatus recited in claim 7 further comprising an accumulator plate fixed between said sides at said output end and canted substantially parallel with the direction of fruit feed.

* * * * *